United States Patent [19]

Clendaniel

[11] 4,337,695

[45] Jul. 6, 1982

[54] FILTER PRESS WITH PIVOTING DIVERTER DOORS

[75] Inventor: W. Richard Clendaniel, Andover, Mass.

[73] Assignee: Ingersoll-Rand Company, Woodcliff Lake, N.J.

[21] Appl. No.: 228,800

[22] Filed: Jan. 26, 1981

[51] Int. Cl.³ .............................................. B01D 25/12
[52] U.S. Cl. .................................. 100/195; 100/198; 210/225; 210/230; 49/114
[58] Field of Search ................................ 100/195–206; 210/225, 230, 232, 248, 409; 49/110, 114, 366–369

[56] References Cited

U.S. PATENT DOCUMENTS 4,229,303 10/1980 Heinrich et al. .................... 210/225

Primary Examiner—Charles N. Hart
Assistant Examiner—David Sadowski
Attorney, Agent, or Firm—Frank S. Troidl

[57] ABSTRACT

The filter press includes pressing members for pressing the liquid out of a slurry of a solid in a liquid to form a solid cake. The pressing members are then separated to drop the cake through open diverter doors. The pressing members are washed after the diverter doors are again closed.

The diverter doors are pivotally mounted with one diverter door having a portion thereof overlapping the top of the other diverter door in the closed position. Means are provided for pivoting the overlapping diverter door from the closed position in a first rotational direction and then in the opposite rotational direction while simultaneously pivoting the other diverter door in said first rotational direction.

4 Claims, 7 Drawing Figures

FILTER PRESS WITH PIVOTING DIVERTER DOORS

This invention relates to filter presses for pressing the liquid out of a liquid-solid slurry. More particularly, this invention is an improved diverter door arrangement forming part of a filter press.

One particular problem with filter presses of the prior art is that the diverter doors do not prevent the leakage of water through the contacting diverter door edges during the wash cycle. After a cake is formed from the solid-liquid slurry, the diverter doors are opened and the cake dropped through the diverter doors. After the cake is dropped through the diverter doors, the diverter doors are again closed and the filter cloths on the filter presses washed, usually by water from water nozzles located above the diverter doors and close to the filter cloths. Unfortunately, with currently-known filter presses, the diverter doors do not prevent the wash water from flowing between the diverter doors even while the doors are closed. Thus, wash water flows between the diverter doors and upon the cake located below the doors. This, of course, is unsatisfactory because, among other things, you are re-wetting cake from which the liquid has been previously removed.

This invention is a new filter press which includes diverter doors which are specifically constructed to prevent the leakage of water while in the closed position. Briefly described, the new filter press includes a means for pressing the liquid out of a slurry to form a solid cake. The pressing members are then separated to release the cake through open diverter doors located below the pressing members. The diverter doors are pivotally mounted with one diverter door having a portion overlapping the other diverter door in the closed position. Means are provided for pivoting the overlapping diverter door from the closed position in a first rotational direction and then in the opposite rotational direction while simultaneously pivoting the other diverter door in said first rotational direction.

The means for pivoting and mounting the two diverter doors is self-locking in the closed position. That is, the doors in the closed position will remain closed without the application of force against the closed diverter doors. It is necessary to exert a force against the self-locking mechanism to open the doors.

The invention, as well as its many advantages, may be further understood by reference to the following detailed description and drawings, in which.

In the various figures like parts are referred to by like numbers.

Figure 1:
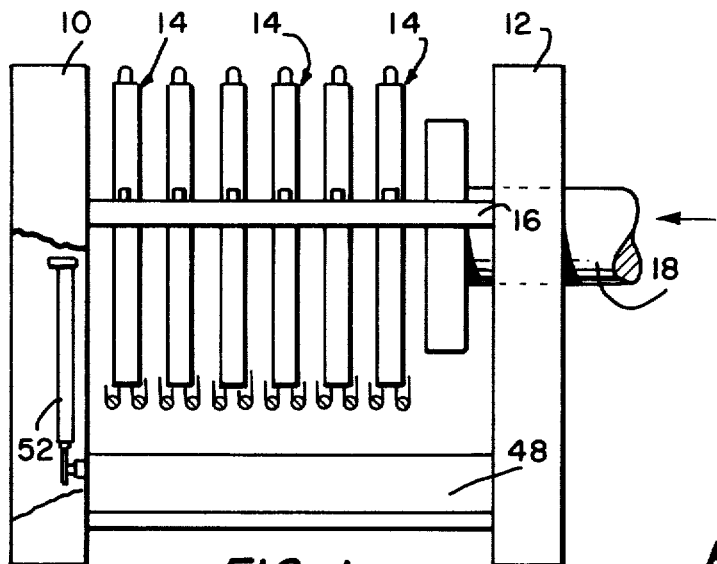
FIG. 1 is a schematic representative of the pressure filter.

Referring to the drawings, and more particularly, to FIG. 1, the filter press includes a pair of longitudinally-separated vertical supports 10 and 12. A plurality of filter and diaphragm plates 14 are mounted for slidable longitudinal movement along a pair of side rails 16 (only one shown in FIG. 1). The filter press may be a fully automatic, horizontal filter press that dewaters a solid-liquid slurry to a high degree of dewatering.

When it is desired to perform a press cycle, the main hydraulic cylinder 18 is hydraulically actuated to move longitudinally against the filter and diaphragm plates 14 to push the plates 14 together until they are closed and clamped.

Figure 2:
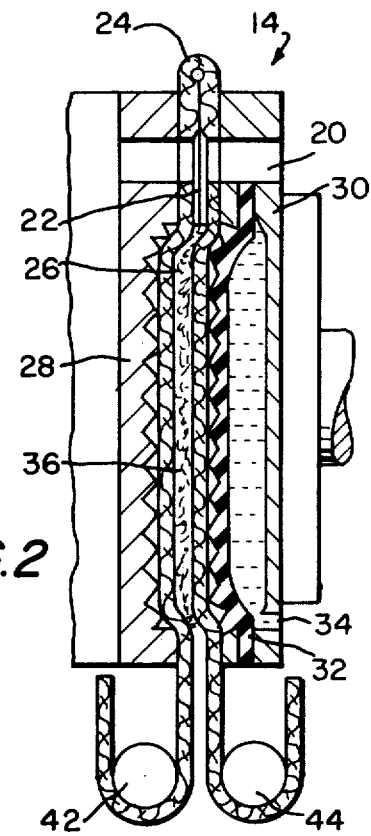
FIG. 2 is a side elevational sectional view showing a single chamber of the filter press during pressing.

FIG. 2 shows an enlarged, sectional view of one of the filter and diaphragm plates 14. A feed slurry is passed through conduit 20 and through the feeding device 22 mounted in the upper part of a filter cloth 24. The feed slurry is fed downwardly through the feeding device 22 into the filtering chamber 26.

Figure 3:
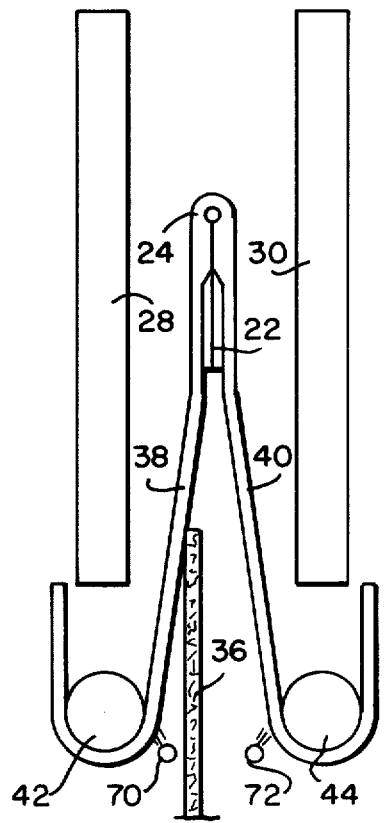
FIG. 3 is a side elevational view showing the filter chamber as the cake is released.

The filter chamber 26 is formed by a filter plate 28 and a diaphragm plate 30. A diaphragm 32 is mounted in diaphragm plate 30. This diaphragm is pressed against filter cloth 24 to press out a large portion of the liquid in the slurry by the addition of high pressure water through conduit 34 in diaphragm plate 30 and against the backside of diaphragm 32 to dewater the feed slurry to form a cake 36. During the pressing cycle shown in FIG. 2, the pressure against the diaphragm 32 is released while preparing the cake 36 for discharge. To release the cake as shown in FIG. 3, the filter plate 28 and diaphragm plate 30 are opened. As the filter cloth 24 and attached feeding device 22 move downwardly, the portions 38 and 40 of the filter cloth spread apart as they move around guide rolls 42 and 44 to release cake 36.

Figure 4:
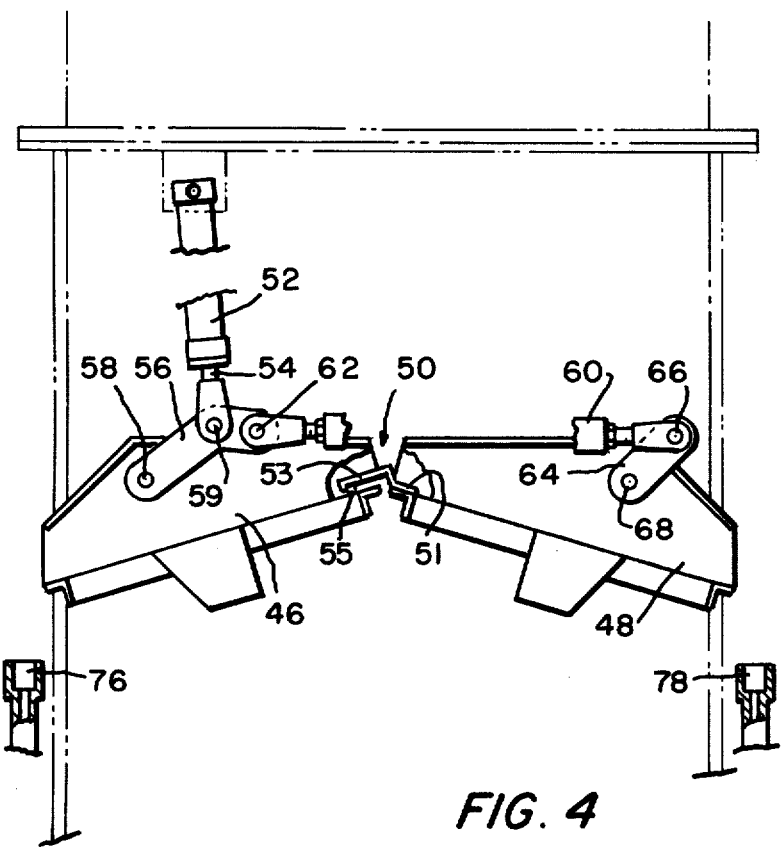
FIG. 4 is a fragmentary view, on an enlarged scale, illustrating the diverter doors in the closed position.

Referring to FIG. 4, a pair of diverter doors 46 and 48 is located below the filter and diaphragm plates. The diverter doors are mounted so that diverter door 48 has a portion 50 overlapping the diverter door 46 in the closed position. Portion 50 is a solid metal member with plate 51 attached to door 48 and a hook 53 integral with plate 51 and extending therefrom. An elastomer seal 55 is bonded to the inside of hook 53. The overlapping feature provides a much better seal than can be obtained by previous diverter doors which do not have the overlapping feature and pivot at the same rate and in the same direction during their opening and closing.

The diverter doors 46 and 48 may be actuated by many different types of actuators. The particular actuator shown includes a fluid operated cylinder 52 mounted on the frame of the filter press. When cylinder 52 is operated, ram 54 is actuated to open the doors 46 and 48. Since one door overlaps the other to prevent water leakage between the door edges in the closed position, it is necessary that door 48 rotate with a definite relationship to door 46 to prevent damage to the door structure. The mechanism shown not only accomplishes this objective, but is self-locking in the closed position.

The door 46 is actuated by the ram 54 extending from cylinder 52 and connected to a crank arm 56 by pin 59. The door 48 is connected to door 46 by a coupler link and is actuated through the coupler link when the door 46 is actuated.

The coupler includes the crank arm 56 connected to door 46 by connecting pin 58. A coupler link 60 is pivotally connected to the crank arm 56 by pivot 62 and also pivotally connected to crank arm 64 on diverter door 48 by pivot 66. The crank arm 64 is also connected to door 48 by connecting pin 68.

The shapes, lengths, and angular positions of the crank arms 56 and 64 are such that the force in the coupler link 60 produces a counterclockwise turning moment about the axis of rotation of door 46 that exceeds the clockwise turning moment produced by the weight of the door 46. The doors will, therefore, stay in the closed position even if the hydraulic cylinder 52 is not applying a lifting force. In fact, it is necessary to apply a downward force from the cylinder 52, or apply a clockwise moment about the axis of rotation of door 46, to open the doors. The counterclockwise turning moment about the axis of rotation of door 48 produced by the weight of the door 48 is counterbalanced by the moment produced by the force in the coupler link 60.

Figure 5:
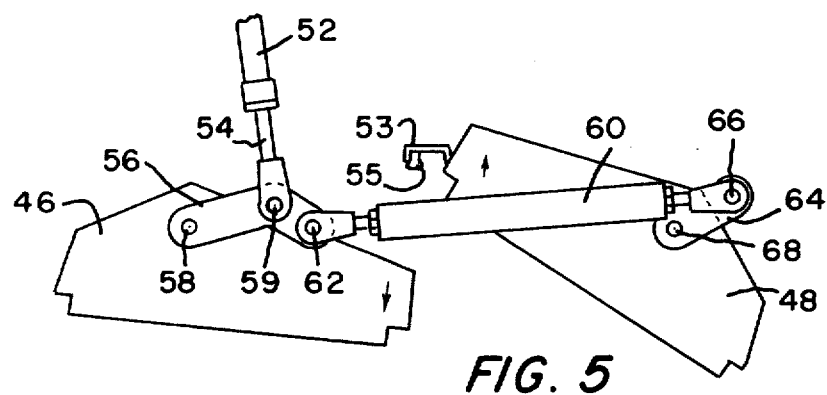
FIG. 5, FIG. 6 and FIG. 7 are fragmentary views of the diverter doors of FIG. 4 sequentially illustrating three sequential positions of each diverter door as the diverter doors are opening.
Figure 6:
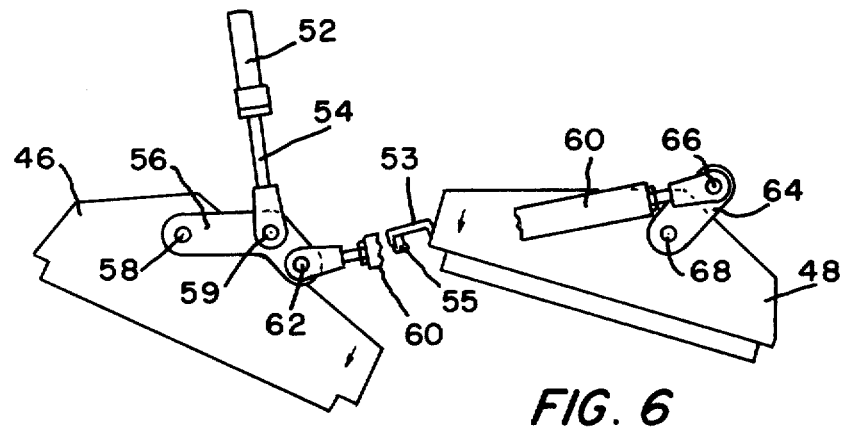
Figure 7:
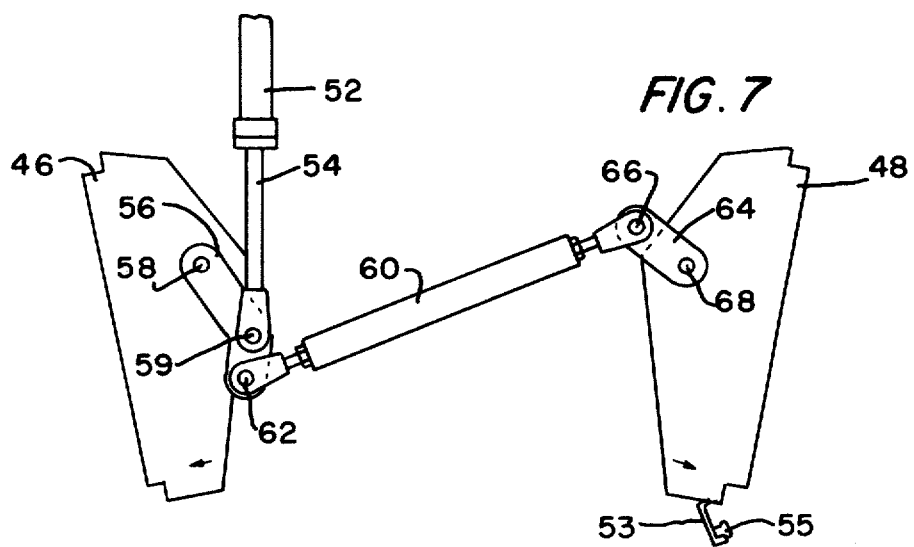

FIG. 4 shows the diverter doors 46 and 48 in the closed position. FIG. 5, FIG. 6 and FIG. 7 show subsequent sequential positions of the doors 46 and 48 when a downward force is applied to the crank 56 by ram 54 in response to actuation of cylinder 52. Referring to FIG. 5, it can be seen that the overlapping diverter door 48 has turned in a clockwise direction while the other door 46 has turned a lesser amount in the clockwise direction. Referring to FIG. 6, it can be seen that the overlapping door 48 has reversed its turning direction and is now turning in the counterclockwise direction while door 46 continues to turn in the clockwise direction. The fully open position is shown in FIG. 7.

The filter press is automatically controlled so that the diverter doors 46 and 48 are fully open when the cycle is such that the portions 38 and 40 of the filter cloth 24 (see FIG. 3) has spread apart to drop the cake 36 through the diverter doors. The diverter doors are then closed in sealing engagement and water is sprayed out of water lines 70 and 72 and against the filter cloth portions 38 and 40 to wash any adhering cake from the cloths. The relative angular portions of the two doors are the same during closing as during opening. The water falls on the diverter doors 46 and 48 and is diverted to water catchers 76 and 78, respectively (See FIG. 4). The bottoms of diverter doors 46 and 48 are inclined downwardly toward water catchers 76 and 78 in the closed position to flow the water to the water catchers.

I claim:

1. A filter press comprising: pressing members for pressing the liquid out of a slurry of a solid in a liquid to form a solid cake; means for separating the pressing members to release the cake; washing means located to flow water against the pressing members; a pair of diverter doors located below the pressing members and washing means, said diverter doors being pivotally mounted with one diverter door having a portion thereof overlapping the other diverter door in the closed position, and means for pivoting the overlapping diverter door from the closed position in a first rotational direction and then in the opposite rotational direction while simultaneously pivoting the other diverter door in said first rotational direction to allow dropping said solid cake through the open diverter doors.

2. A filter press in accordance with claim 1 wherein: the means for pivoting the diverter doors is adapted to continuously first pivot the overlapping door in a clockwise direction and then in a counterclockwise direction and pivot the other door continuously in the clockwise direction.

3. A filter press in accordance with claim 2 wherein the means for pivoting the diverter doors comprises: an actuatable crank arm connected to one of the diverter doors; a crank arm connected to the other diverter door; and a coupler link interconnecting the crank arms.

4. A filter press in accordance with claim 3 wherein: said means for pivoting provides that when the diverter doors are in the closed position, they are locked in the closed position unless an actuating force in a proper direction to open the doors is applied to the actuatable crank arm.

* * * * *